US012676433B2

(12) United States Patent
Kasai et al.

(10) Patent No.: US 12,676,433 B2
(45) Date of Patent: Jul. 7, 2026

(54) CONNECTOR WITH SHIELDING PLATES TO BLOCK NOISE BETWEEN ADJACENT CHANNELS

(71) Applicant: YAMAICHI ELECTRONICS CO., LTD., Tokyo (JP)

(72) Inventors: Eiji Kasai, Tokyo (JP); Hiroshi Takahira, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 328 days.

(21) Appl. No.: 18/573,211

(22) PCT Filed: Jun. 22, 2021

(86) PCT No.: PCT/JP2021/023660
§ 371 (c)(1),
(2) Date: Dec. 21, 2023

(87) PCT Pub. No.: WO2022/269770
PCT Pub. Date: Dec. 29, 2022

(65) Prior Publication Data
US 2024/0291185 A1 Aug. 29, 2024

(51) Int. Cl.
*H01R 13/6585* (2011.01)
*H01R 12/71* (2011.01)
*H01R 13/6471* (2011.01)

(52) U.S. Cl.
CPC ....... *H01R 12/716* (2013.01); *H01R 13/6471* (2013.01); *H01R 13/6585* (2013.01)

(58) Field of Classification Search
None
See application file for complete search history.

(56) References Cited

U.S. PATENT DOCUMENTS 10,424,860 B2 * 9/2019 Okuyama .............. H01R 31/08
10,431,936 B2 * 10/2019 Horning ............... H01R 13/502
10,559,929 B2 * 2/2020 Pickel ................ H01R 13/6471
2007/0111600 A1 5/2007 Tokunaga
(Continued)

FOREIGN PATENT DOCUMENTS

CN 107078426 A * 8/2017 ............. H01R 12/73
JP H11329603 A 11/1999
(Continued)

*Primary Examiner* — Tho D Ta
(74) *Attorney, Agent, or Firm* — Hayes Soloway PC

(57) ABSTRACT

According to an embodiment, a connector includes a receptacle unit and a plug unit, and electrically connects external boards by inserting, fitting and connecting the plug unit into the receptacle unit in a first direction. The receptacle unit includes a plurality of first contacts arranged at predetermined intervals in a second direction orthogonal to the first direction and connected at one end to a first external board. The plug unit includes a plurality of second contacts corresponding respectively to the first contacts and arranged in the second direction, each of the second contacts having one end connected to the other end of the first contact and the other end connected to the second external board. At least either of the receptacle unit and the plug unit includes a plurality of shielding plates that are provided so as to be separated from each other in at least the second direction and each correspond to a different channel.

12 Claims, 21 Drawing Sheets

(56) References Cited

U.S. PATENT DOCUMENTS

| | | | | |
|---|---|---|---|---|
| 2018/0026400 | A1 * | 1/2018 | Morgan | H01R 12/58<br>439/78 |
| 2018/0287301 | A1 | 10/2018 | Tanaka et al. | |

FOREIGN PATENT DOCUMENTS

| | | | |
|---|---|---|---|
| JP | 2007220427 | A | 8/2007 |
| JP | 2019160492 | A | 9/2019 |

* cited by examiner

CONNECTOR WITH SHIELDING PLATES TO BLOCK NOISE BETWEEN ADJACENT CHANNELS

CROSS-REFERENCE TO RELATED APPLICATIONS AND PRIORITY

This patent application claims priority from PCT Application No. PCT/JP2021/023660 filed Jun. 22, 2021. This patent application is herein incorporated by reference in its entirety.

TECHNICAL FIELD

The present disclosure relates to the technical field of connector, and more specifically, to a board-to-board connector for electrically connecting two boards.

BACKGROUND

Conventionally, in connectors for high-speed transmission, crosstalk that can occur between contacts has been reduced by attaching a conductive resin member in contact with the contacts to dull the waveform of the transmission characteristics.

However, since it is not easy to give the conductive resin member an elastic structure, the contact with the contacts may become unstable, and there is also a problem that the cost increases due to the conductive resin material.

PRIOR ART REFERENCE

Patent Document

Patent Document 1: Japanese Patent Application Publication No. 2007-220427

Patent Document 2: Japanese Patent Application Publication No. 2019-160492

SUMMARY

Problems to be Solved

The present disclosure has been made in view of the above circumstances, and one of the main objects is to provide a connector for high-speed transmission that reduces crosstalk between contacts and has a stable contact structure.

Means for Solving the Problem

In accordance with a first aspect of the present disclosure, there is provided a connector including: a receptacle unit mounted on a first external board; and a plug unit mounted on a second external board and connected to the receptacle unit, and electrically connecting the first external board and the second external board by inserting, fitting and connecting the plug unit into the receptacle unit in the first direction,

- wherein the receptacle unit includes a plurality of first contacts arranged at predetermined intervals in a second direction orthogonal to the first direction and connected at one end to the first external board,
- the plug unit comprises a plurality of second contacts corresponding respectively to the first contacts and arranged in the second direction, each of the second contacts having one end connected to the other end of the first contact and the other end connected to the second external board,

- the first contacts and the second contacts are configured by arranging a plurality of sets of two ground contacts that sandwich a plurality of signal contacts therebetween corresponding to each channel,
- at least either of the receptacle unit and the plug unit further includes a plurality of shielding plates that are provided so as to be separated from each other in at least the second direction and each correspond to a different channel, and are respectively electrically connected to the ground contacts of the corresponding channels or to ground of the first or the second external board.

The first contacts and the second contacts may be provided in a plurality of rows in a third direction orthogonal to both the first direction and the second direction.

The shielding plate may be provided between channels adjacent in the third direction.

In this aspect, the connector may further include a conductive resin member provided at an end portion on a side of the first or second external board to be connected in the receptacle unit and the plug unit, wherein the conductive resin member is provided corresponding to a channel other than the channels provided with the corresponding shielding plates among the channels, and is electrically connected to the ground contact of the corresponding channel.

The shielding plate may have a short strip-like metal plate and a hook portion extending from both ends of one end portion of the metal plate, bent into a hook shape toward the other end portion, and grounded.

Further, at least either of the receptacle unit and the plug unit may be bored with a hole that allows insertion of the shielding plate between channels adjacent in the third direction.

Further, the hole may further have a guide groove which is a groove with a size corresponding to a width of the shielding plate, and is formed to extend outward in the second direction from inner wall surfaces facing in the second direction of the hole to guide the insertion of the shielding plate.

Further, the shielding plates may be arranged for respective channels adjacent in the third direction, and

- the shielding plates may be mounted to the receptacle unit or the plug unit by being respectively press-fitted into the guide grooves in a set of two so that the hook portions face in opposite directions to each other.

Further, the shielding plates may be arranged so as to be exposed from an outer surface of the connector through the hole.

Further, the receptacle unit may include a fixed housing composed of a hollow frame body and fixed to the first board; and a floating housing accommodated with a movable space in an opening portion surrounded by the frame body of the fixed housing, wherein the first contact may include: a first supporting piece portion bridged between the fixed housing and the floating housing and supported by the fixed housing; a second supporting piece portion supported by the floating housing; and an elastically deformable elastic deformation portion interposed between these two supporting piece portions, the elastic deformation portion may include: two linear portions extending along wall portions facing the movable space in the fixed housing and the floating housing; and a flexible portion between upper ends of the two linear portions, and portions opposed to the flexible portion in the wall portions may be curved following a shape of the flexible portion.

The first contact may have a terminal portion connected to the first support piece portion and a contact point portion connected to the second support piece portion. The fixed housing may have first wall portions opposed to each other so as to surround the opening portion. The floating housing may have a slot into which the plug unit is inserted, and the floating housing may be provided with a through hole penetrating from a bottom surface toward the inside of the slot. The contact may be press-fitted into the fixed housing and the floating housing such that the contact point portion is protruded into the slot via the through hole and the elastic deformation portion is accommodated in the movable space.

Further, the conductive resin member may include: a lower plate portion; and a convex portion protruding from a center of the lower plate portion to a second side opposite to a first side that is a side of the first or the second external board, the convex portion may be fitted in a groove provided in a surface of the receptacle unit or the plug unit on a side of the external board.

Furthermore, the lower plate portion may have a shape in which four corners of a rectangular parallelepiped are protruded outward in a third direction orthogonal to both the first direction and the second direction, a pillar portion erecting on the second side from the portion protruded outward, may be provided, and the pillar portion may be in contact with a ground contact of a corresponding channel.

Effects

According to the present disclosure, there is provided a connector for high-speed transmission that has a stable contact structure with reduced crosstalk between contacts.

DETAILED DESCRIPTION

Figure 1:
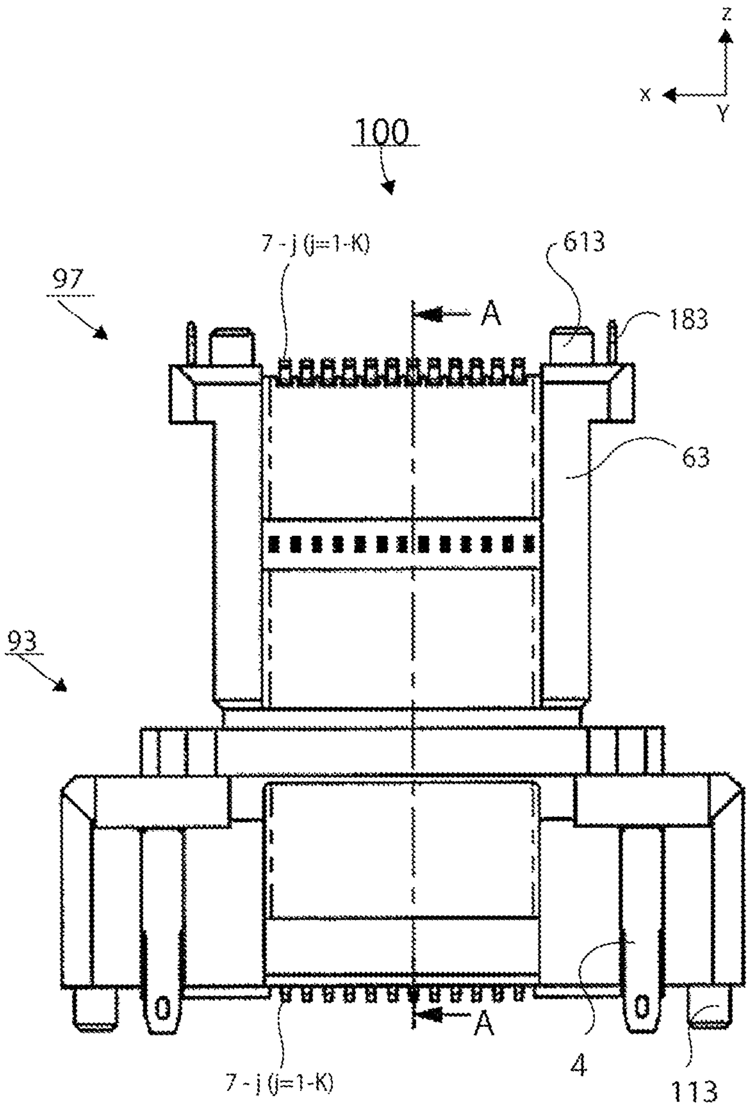
FIG. 1 is an example of a diagram showing an overall configuration of a connector according to one embodiment of the present disclosure.

Hereinafter, some of the embodiments of the present disclosure will be described with reference to the drawings. In the drawings, the same or corresponding elements and members are designated by the same reference numerals, and duplicate description thereof will be omitted as appropriate. In addition, the shapes and sizes of the respective members shown in the drawings are appropriately enlarged, reduced or omitted for the purpose of facilitating explanation, and for this reason, they may not be consistent with the actual scale and ratio. Also, in the explanation of the drawings, it should be noted that the terms “upper” and “lower” are used for convenience in accordance with the up and down direction of the paper surface, and therefore may not correspond to the direction of gravitational acceleration.

Terms such as first, second and the like used below are only identification symbols for distinguishing the same or corresponding components, and therefore, the same or corresponding components are not particularly limited to these terms first, second and the like.

Also, “couple” is a concept that includes not only the case where components are physically in direct contact with each other in the contact relationship between the components, but also the case where other configurations are interposed between the in components and the respective components are in contact with the other configurations, respectively.

FIG. 1 shows an overall configuration of a connector according to one embodiment of the present disclosure. The connector 100 according to the present embodiment is a board-to-board type connector equipped with a plug unit 97 connected to a first external board (not shown) and a receptacle unit 93 connected to a second external board (not shown), and connecting the first external board and the second external board by reversing the plug unit 97 in the Z direction in the figure and inserting and fitting its header 62 into a slot 20 of the receptacle unit 93. The plug unit 97 and the receptacle unit 93 include contacts for realizing electrical connection between the first external board and the second external board. In the present embodiment, for example, an electronic board and an expansion board are will be described as the first external board and the second external board.

Crosstalk Reduction Structure

Figure 2:
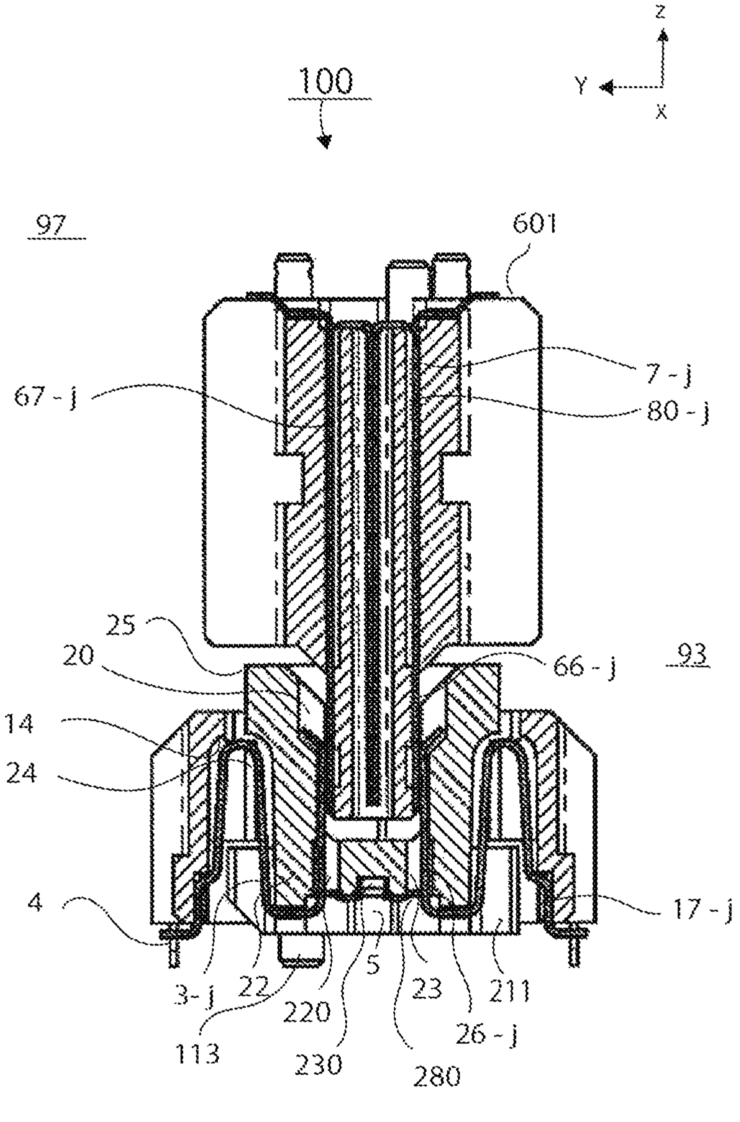
FIG. 2 is a cross-sectional view of the connector 100 taken along line A-A in FIG. 1.

FIG. 2 shows a cross-sectional view of the connector 100 taken along line A-A in FIG. 1. As shown in FIG. 2, the plug unit 97 has K contacts 7-*j* (j=1 to K) (K is, for example, 144). The contacts 7-*j* are arranged in the plug unit 97 at predetermined intervals in the X direction orthogonal to the Z direction, respectively.

Similarly, the receptacle unit 93 has K contacts 3-*j* (j=1 to K) (K is, for example, 144) arranged inside. These contacts 3-*j* are also arranged in the X direction at predetermined intervals so as to correspond to the contacts 7-*j* of the plug unit 97, respectively.

Figure 11:
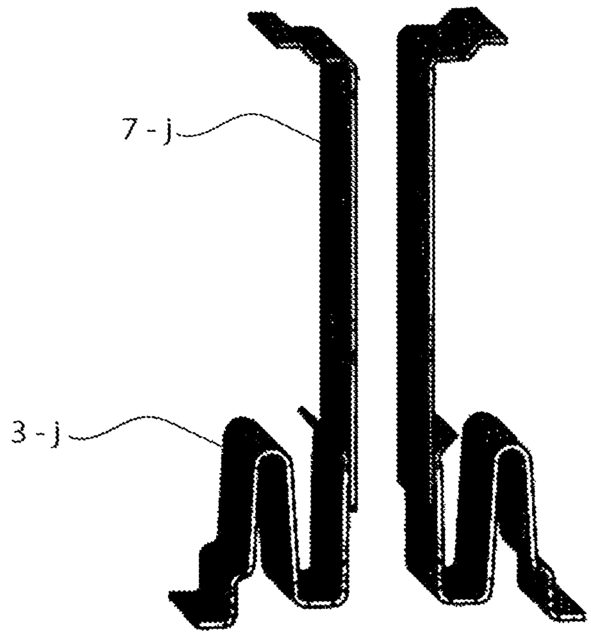
FIG. 11 is an example of a perspective view showing a connection form of a contact 7-*j* and a contact 3-*j;*

As shown in FIG. 2, the contacts 3-*j* of the receptacle unit 93 (j=1 to K) and the contacts 7-*j* of the plug unit 97 are arranged in multiple rows in the Y direction orthogonal to the Z direction and the X direction in each unit. In the present embodiment, two rows are arranged symmetrically about the center line along the Z direction of each unit. By inserting and fitting the plug unit 97 into the receptacle unit 93, as shown in the perspective view of FIG. 11, the tip end portion (in the −Z direction) of the contact 7-*j* of the plug unit 97 abuts on the tip end portion (in the +Z direction) of the contact 3-*j* of the receptacle unit 93, thereby the contacts 7-*j*, 3-*j* of both units 93, 97 are electrically connected to each other.

In the following description, a fitting direction of the plug unit 97 with respect to the receptacle unit 93 is appropriately referred to as a Z direction, a direction which is orthogonal to the Z direction and in which the contacts 7-*j*, 3-*j* are respectively arranged to form a row is appropriately referred to as an X direction, and a direction in which the rows of the contacts 7-*j*, 3-*j* are arranged in a plurality of arrays and which is orthogonal to both the Z direction and the X direction is appropriately referred to as a Y direction. The Z direction, the X direction and the Y direction correspond, for example, to the first to third directions defined in the Claims, respectively. In addition, the +Z side may be referred to as an upper side, the −Z side may be referred to as a lower side, the +X side may be referred to as a front side, the −X side may be referred to as a rear side, the +Y side may be referred to as a left side, and the −Y side may be referred to as a right side. However, it should be noted that with respect to FIGS. 3, 5, 7, and 8, these upper and lower designations are reversed to facilitate the related explanation.

Further, among the contacts 3-*j* (j=1 to K) of the receptacle unit 93 and the contacts 7-*j* (j=1 to K) of the plug unit 97, letter (G) is attached to the contacts 3-*j* and contacts 7-*j* for ground of differential transmission, and letter(S) is attached to the contacts 3-*j* and contacts 7-*j* for signal to distinguish between them.

Figure 6:
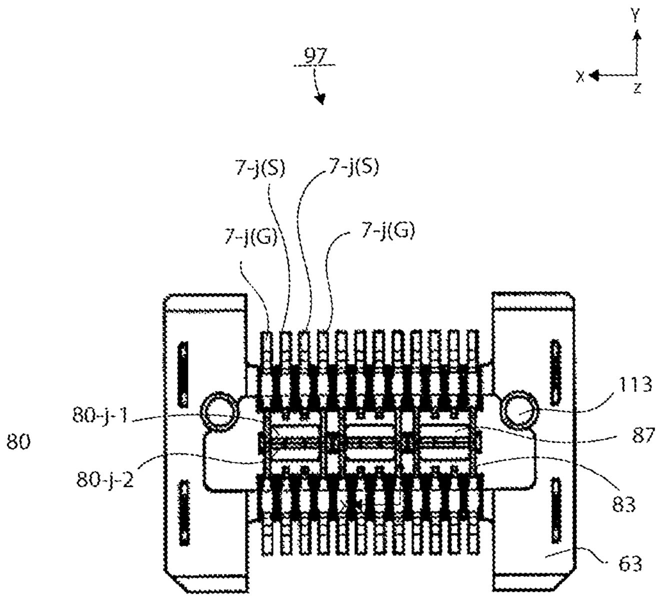
FIG. 6 is a bottom view of the plug unit 97 included in the connector shown in FIG. 1 as viewed from a +Z side.
Figure 16:
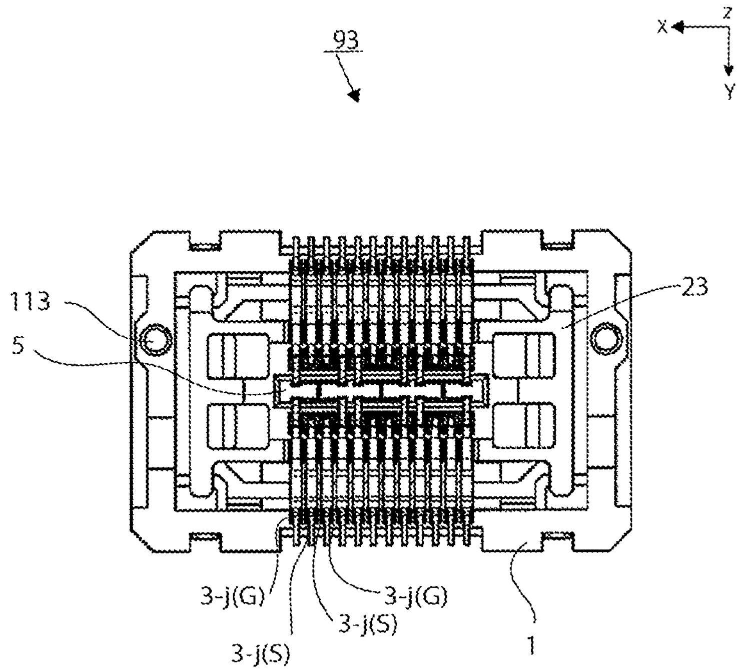
FIG. 16 is a bottom view of the receptacle unit 93 shown in FIG. 13 as viewed from a lower (−Z) side.

In the connector 100 of the present embodiment, with respect to each row of the contacts 7-*j*, provided on the plug unit 97, for example, as shown in FIG. 6, two signal contacts 7-*j*(S) are sandwiched between two ground contacts 7-*j* (G) to constitute one channel. Correspondingly, for the receptacle unit 93, for example, as shown in FIG. 16, two signal contacts 3-*j*(S) are sandwiched between two ground contacts 3-*j* (G) to similarly constitute one channel.

Among several feature points of the present embodiment, the first feature point is that at least either of the plug unit and the receptacle unit includes a shielding plate for absorbing intersignal noise. In the present embodiment, an embodiment in which a plug unit is provided with a shielding plate will be described.

Figure 12:
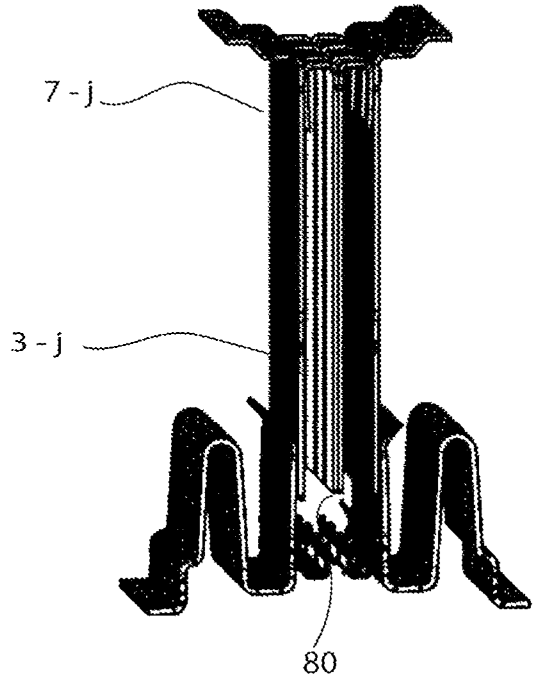
FIG. 12 is an example of a perspective view showing a positional relationship between the shielding plate 80 and the contacts 7-*j*, 3-*j;*

Specifically, as shown in the cross-sectional view of FIG. 2, the plug unit 97 included in the connector 100 of the present embodiment includes shielding plates 80-*j*-1, 80-*j*-2 (j=1 to K) arranged in the plug unit 97 so as to be sandwiched between two rows of contacts 7-*j* (j=1 to K) arranged oppositely in the Y direction and separated from each other in the X direction (see FIG. 12). All these shielding plates 80-*j*-1, 80-*j*-2 are arranged for respective channels each consisting of a ground contact 7-*j* (G), a signal contact 7-*j*(S), a signal contact 7-*j*(S) and a ground contact 7-*j* (G), and are electrically connected to the ground contacts 7-*j* (G) or directly electrically connected to an expansion board (not shown).

A more specific configuration of the shielding plate 80 and a method of incorporating it into the connector will be described in detail later.

Figure 3:
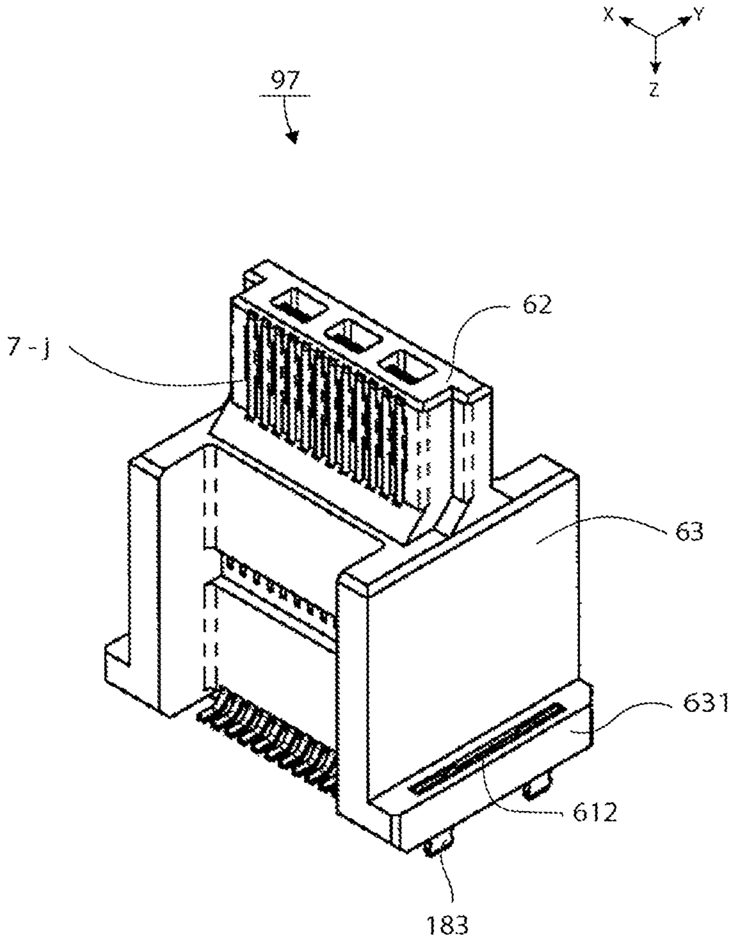
FIG. 3 is an example of a perspective view of a plug unit 97 included in the connector shown in FIG. 1.
Figure 4:
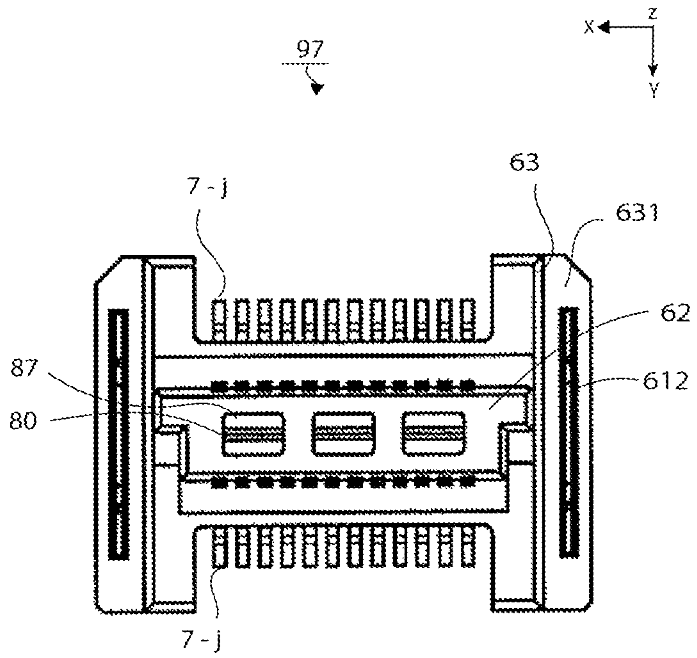
FIG. 4 is a plan view of the plug unit 97 included in the connector shown in FIG. 1 as viewed from a −Z side.

The detailed configuration of the plug unit 97 will be described with reference to FIGS. 3 to 9. FIG. 3 is an example of a perspective view of the plug unit 97, and FIG. 4 to FIG. 7 are examples of the plan view, front view, bottom view and right-side view of the plug unit 97 shown in FIG. 3 as viewed from the −Z side, −Y side, +Z side and −X side, respectively. FIG. 8 is an example of an exploded perspective view of the plug unit 97. As shown in FIG. 3 to FIG. 8, the plug unit 97 has a housing 6, contacts 7-*j*, shielding plates 80 and anchor plates 8. The housing 6 has a header 62 and a base portion 63.

Figure 5:
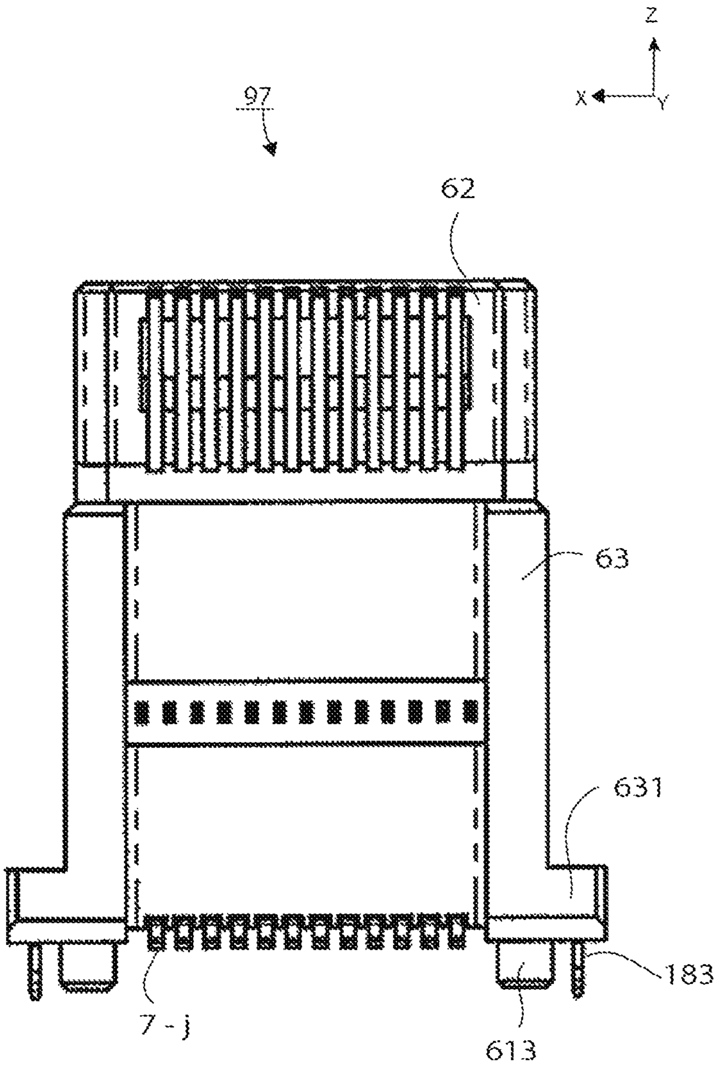
FIG. 5 is a front view of the plug unit 97 included in the connector shown in FIG. 1 as viewed from a −Y side.
Figure 7:
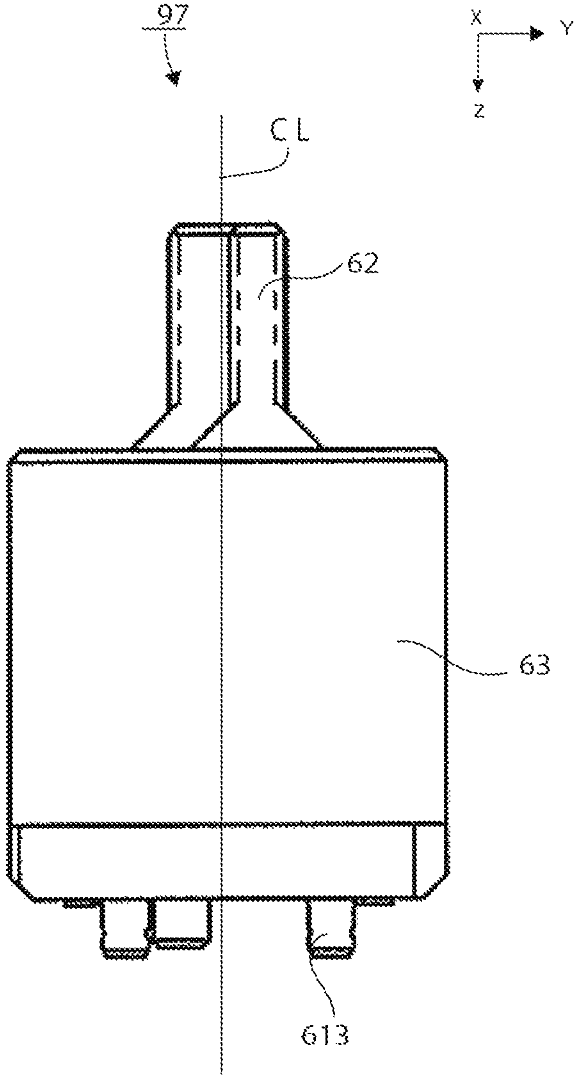
FIG. 7 is a right-side view of the plug unit 97 included in the connector shown in FIG. 1 as viewed from an −X side.
Figure 8:
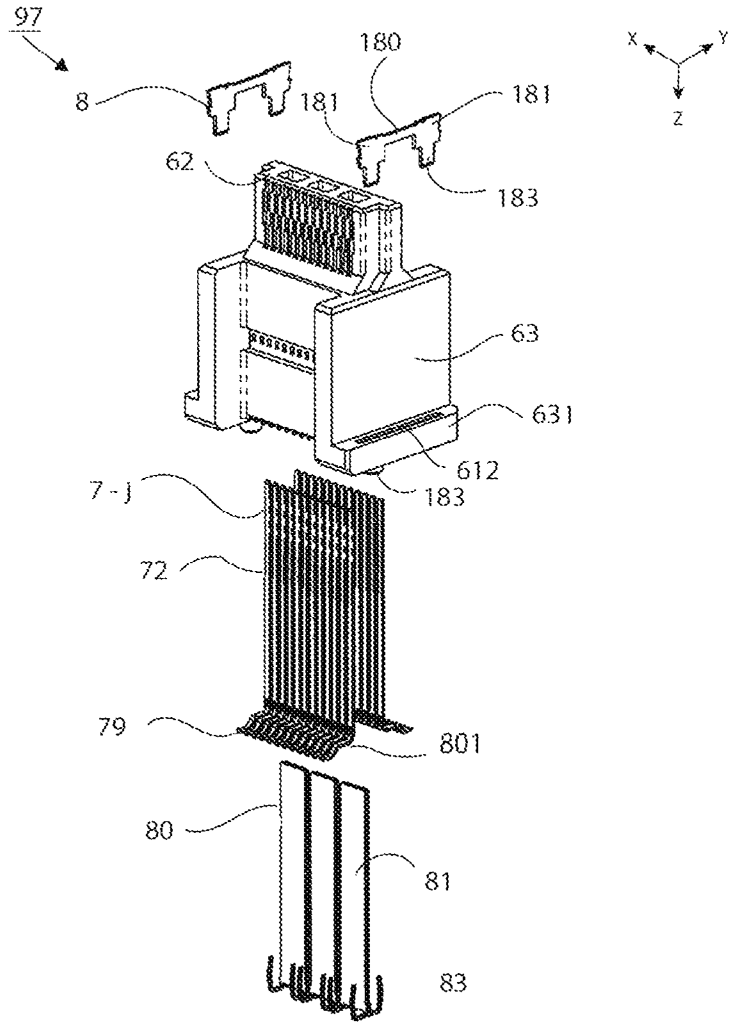
FIG. 8 is an example of an exploded perspective view of a plug unit 97 included in the connector shown in FIG. 1.
Figure 9:
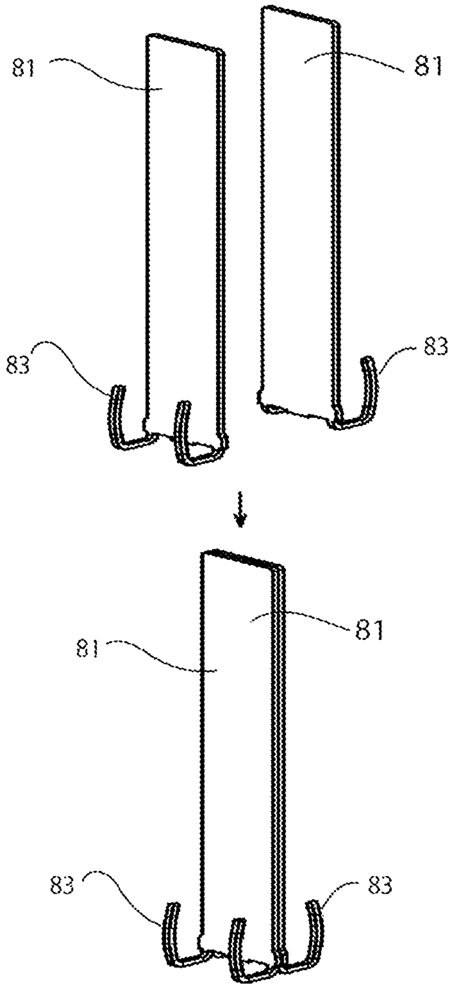
FIG. 9 is an example of a perspective view showing a detailed configuration of a shielding plate 80.

As shown in FIG. 5 to FIG. 7, positioning bosses 613 are provided on the upper surface (lower in the paper surface of the figure) side (+Z side) of the front and rear (X direction) side surfaces of the base part 63. The positioning bosses 613 are fitted into the positioning holes of the expansion board when fixing the plug unit 97 to the expansion board.

In addition, as shown in FIG. 3, the upper edges (lower edges in the paper surface) of both front and rear (X direction) side surfaces in the base portion 63 expand outward in the front and rear (X direction) as outer edge portions 631. The outer edge portion 631 is provided with a holder 612 for mounting the anchor plate 8.

As shown in FIG. 8, the anchor plate 8 has two rectangular piece portions 181, a bridged portion 180 bridged between the lower ends (upper edges in the paper surface) of the two rectangular piece portions 181, and a protruding portion 183 protruding upward from the upper edge (downward from the lower edge in the paper surface) of the two rectangular piece portions 181. The anchor plate 8 is mounted on the holder 612 provided at the outer edge portion 631 of the base portion 63, and the protruding portion 183 thereof extends to further upper (+Z) side (lower side in the paper surface) of the upper end (lower edge in the paper surface) of the housing 6, as shown in FIG. 3 and FIG. 5.

As shown in FIG. 2, rows of K/2 through holes 67-*j* arranged forward and rearward (in the X direction) are provided on the left (−Y) side and the right (+Y) side of a center (see virtual center line CL in FIG. 7) of the base portion 63 along the Z direction, respectively. The through hole 67-*j* penetrates through the base portion 63 upward and downward. Slits 66-*j* are formed in the left (−Y) side surface and right (+Y) side surface of the header 62, respectively, and communicate with the left and right through holes 67-*j*, respectively.

As shown in the middle of FIG. 8, the contacts 7-*j* (j=1 to K) are configured to form two rows on the left and right (in the Y direction) of each K/2 contacts 7-*j*, and each has a linear portion 72 extending in the up and down (±Z) direction on one end side, a terminal portion 79 extending in the left and right (±Y) direction on the other end side, and a connecting portion 801 interposed between them.

During assembly, the contacts 7-*j* (j=1 to K) are press-fitted into the housing 6 of the plug unit 97 from the open ends of the linear portions 72 shown on the upper (−Z) side of the paper surface of FIG. 8. The linear portion 72 is inserted into the through hole 67-*j* (see FIG. 2), the tip end (open end) side of which passes through the through hole 67-*j* and is held in the slit 66-*j*, and is connected to the contact 3-*j* of the receptacle unit 93 by the later fitting process between the units. As shown in FIG. 2, the terminal portion 79 of the contact 7-*j*, together with the connecting portion 801, remains in a state exposed on the upper side of the upper surface of the housing 6. The terminal portion 79 of the contact 7-*j* is soldered and fixed to the pad of the expansion board when the plug unit 97 is coupled to the expansion board.

As shown in the lower section of FIG. 8, the shielding plate 80 has an elongated short strip-like metal plate 81 extending in the Z direction, and a hook portion 83 provided at an end portion of the metal plate 81. Although the hook portion 83 may be molded separately from the metal plate 81 and joined together, it is preferable to mold the hook portion 83 integrally with the metal plate 81 in consideration of assembly strength and the like. For example, by punching or the like from a single short strip-like metal plate, the central part of the end portion may be removed so that both sides in the transverse direction at one end in the longitudinal direction selectively remain elongated, and the remaining extension portions on both sides may be bent to form a hook shape. By forming the hook portion 83 integrally with the metal plate 81, a more flexible elastic structure can be provided.

In the present embodiment, the hook portion 83 is electrically connected to the ground contact 7-*j* (G) of each channel as shown in FIG. 6. Therefore, the shielding plate 80 is formed of a conductor made of a metal such as copper (Cu) or nickel (Ni), a metal alloy, or the like. Note that, as described above, the ground connection of the shielding plate 80 is not limited to the electrical connection to the ground contact 7-*j* (G) via the hook portion 83 as in the present embodiment, and may be realized via the wiring of the expansion board by directly connecting the shielding plate 80 to the ground of the expansion board by, for example, soldering or the like. In that case, the size of the shielding plate 80 is selected so that its end portion on the +Z side is flush with or extends beyond the top surface (+Z side surface) 601 (see FIG. 12) of the base portion 63.

In the present embodiment, the hook portion 83 also functions as an elastic body, so that it can also absorb external impact. This function becomes more stable by integrally molding with the metal plate 81.

The shielding plates 80 are arranged corresponding to each channel, and are arranged so as to be separated from each other in the front and rear (X direction), and in the present embodiment, are arranged so as to correspond two channels on the left side and right side (±Y direction), respectively. Since the hook portions 83 are arranged to form two rows on the left and right, as shown in the perspective view of FIG. 9, the hook portions 83 are arranged so as to face oppositely to each other on the left side and right side (Y direction).

Figure 10:
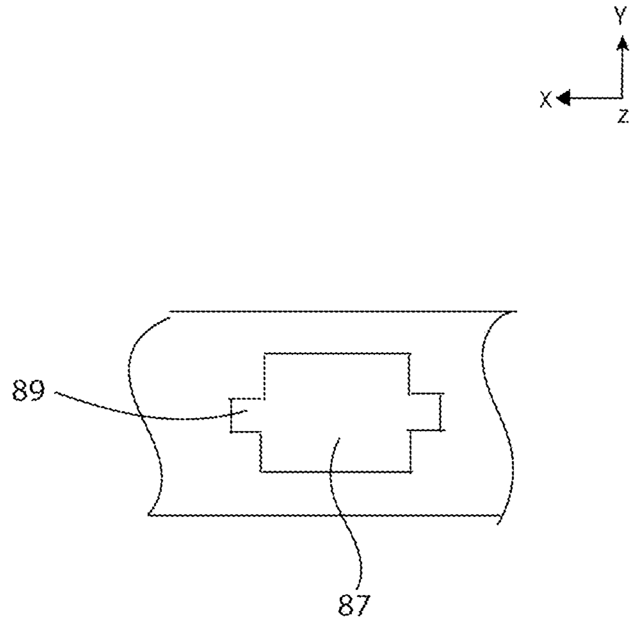
FIG. 10 is an example of a partially enlarged view of FIG. 6.

As shown in FIG. 6, the plug unit 97 is provided with holes 87 corresponding to respective channels along the center (Z direction) thereof, and the shielding plates 80 are press-fitted into the holes 87. This hole 87 can be formed, for example, using a so-called lightening hole that is generally provided to ensure a margin during molding. FIG. 10 is an example of a partially enlarged view of FIG. 6. In the present embodiment, as shown in FIG. 10, guide grooves 89 for guiding the shielding plate 80 during press-fitting are provided on inner walls of the hole 87 in the front and rear (X direction). The depth of the guide groove 89 corresponds to the width of the shielding plate 80, and the width of the guide groove 89 corresponds to the thickness of the shielding plate 80. In the present embodiment, the guide grooves 89 are arranged back-to-back in two rows in the Y direction on the left and right (±Y) sides, so the depth of the guide groove 89 correspond to the thickness of two shielding plates 80. After the shielding plate 80 is press-fitted, an air layer remains between the wall surface of the hole 87 and the shielding plate 80 excluding the region of the guide groove 89.

As a specific method of press-fitting the shielding plate 80, for example, if the shielding plate 80 is aligned with the guide grooves 89 of the hole 87 and then press-fitted into the hole 87 from the tip end sides of the shielding plate 80 along the guide grooves 89, it can be stably incorporated into the plug unit 97.

The perspective view of FIG. 12 shows the positional relationship between the shielding plate 80 and the contacts 7-*j*, 3-*j* in the present embodiment. As is clear from comparison with FIG. 11, the shielding plates 80 are arranged back-to-back so as to have a one-to-one correspondence with each channel between the rows of contacts 7-*j*, 3-*j* arranged in two rows on the left and right (in the Y direction).

In this way, in the connector 100 of the present embodiment, since the shielding plate 80 is provided for each channel, the inside of the connector is electrically divided for each channel, and thereby, not only the noise that may occur between the channels adjacent in the front and rear (±X direction), but also the noise may occur between the signal contacts 7-*j*(S) of the channels adjacent in the left and right (±Y direction) are absorbed, so crosstalk can be significantly reduced.

In the present embodiment, for example, as shown in FIG. 3, the tip end (the side opposite to the hook portion 83) of the shielding plate 80 remains inside the top surface (the top surface in the −Z direction) of the header 62, the structure and assembly mode of the shielding plate 80 are not limited to this, and the shielding plate 80 may be assembled by selecting a size so that it is flush with the top surface of the header 62 or exposed to the outside. In that case, there is an advantage that it also functions to release (surge) static electricity that may be generated when the plug unit 97 is inserted and fitted into the receptacle unit 93.

Floating Structure

Among several feature points of the present embodiment, the second feature point is that the receptacle unit 93 has a floating structure for eliminating misalignment that may occur when the plug unit 97 is fitted.

Figure 13:
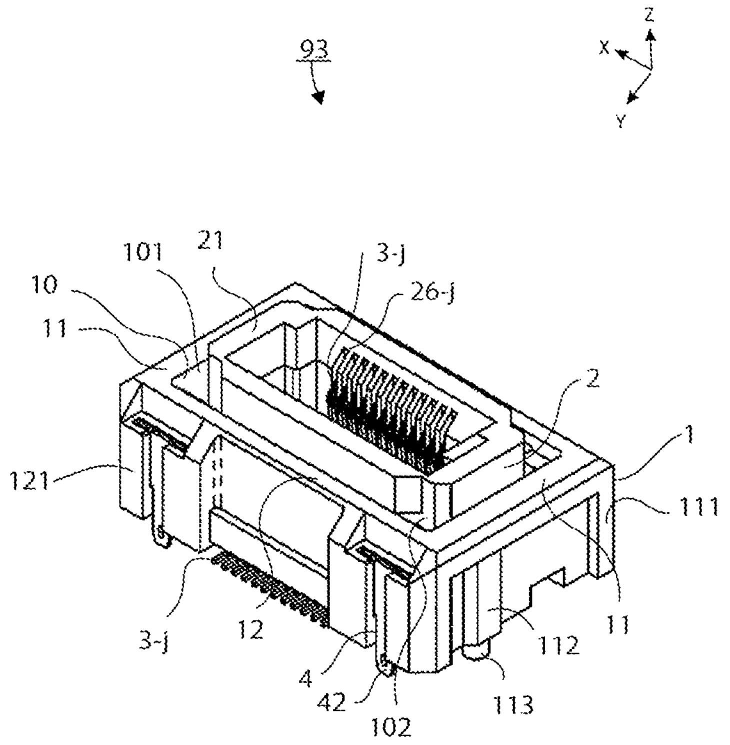
FIG. 13 is an example of a perspective view of a receptacle unit 93 included in the connector shown in FIG. 1.

First, the basic configuration of the receptacle unit 93 will be described. FIG. 13 shows an example of a perspective view showing a schematic configuration of the receptacle unit 93, and FIG. 14 to FIG. 17 are a plan view as viewed from the +Z side, a front view as viewed from the −Y side, a bottom view as viewed from the −Z side, and a right-side view as viewed from the −X side of the receptacle unit 93 shown in FIG. 13, respectively. FIG. 18 is an example of an exploded perspective view of the receptacle unit 93.

As shown in FIG. 13 to FIG. 17, the receptacle unit 93 has a fixed housing 1, a floating housing 2, contacts 3-*j* (j=1 to K), anchor plates 4, and a conductive resin member 5.

As shown in FIG. 18, the fixed housing 1 is composed of a rectangular hollow frame body, and the frame body is composed of wall portions 11 facing each other in the X direction and wall portions 12 facing each other in the Y direction. Hereinafter, the area surrounded by the wall portions 11 and the wall portions 12 will be referred to as an opening portion 10.

Figure 17:
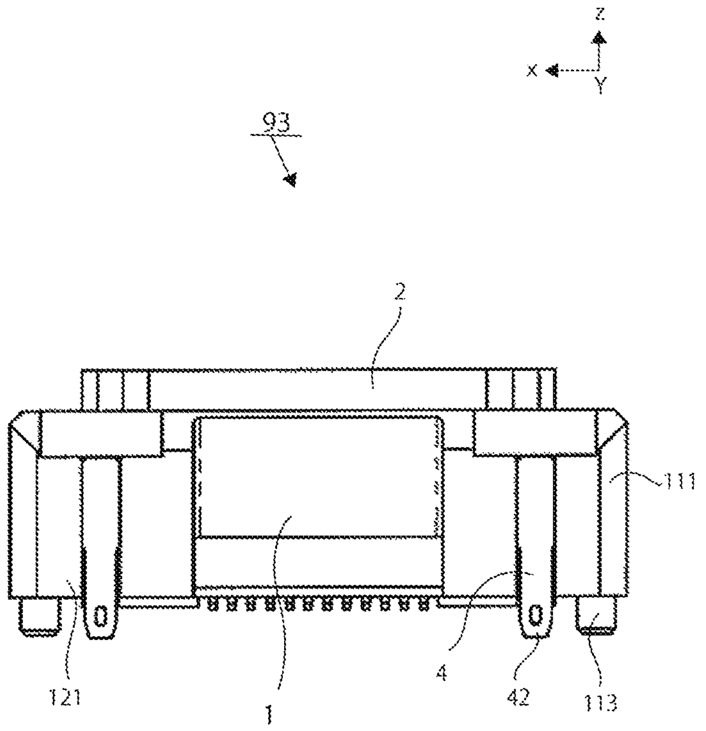
FIG. 17 is a right-side view of the receptacle unit 93 shown in FIG. 13 as viewed from a rear (−X) side.
Figure 18:
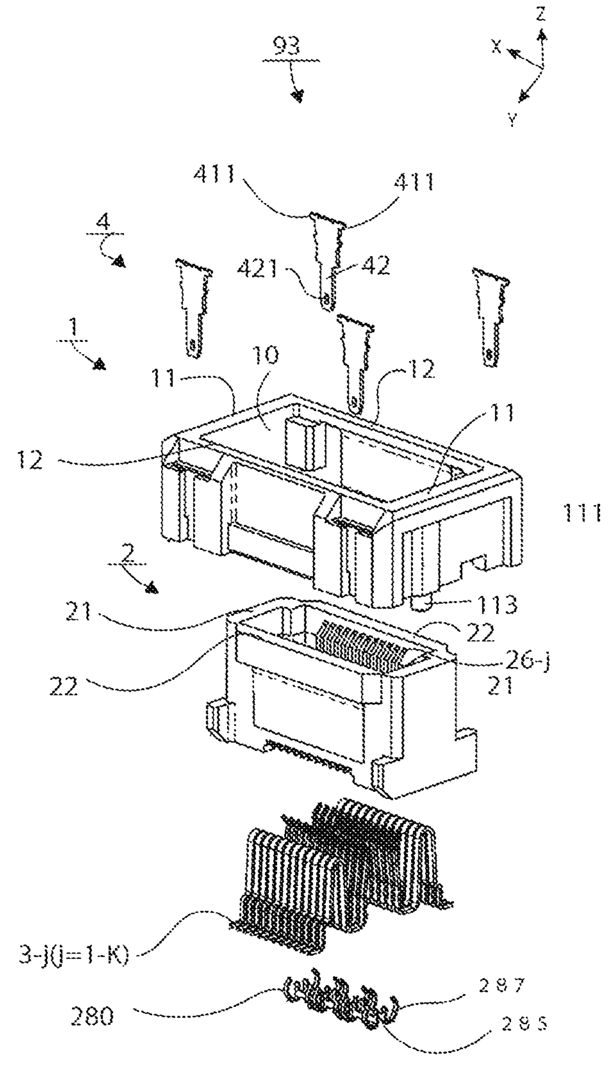
FIG. 18 is an example of an exploded perspective view of the receptacle unit 93 shown in FIG. 13.

As shown in FIG. 13, FIG. 17 and FIG. 18, the upper (+Z) and left and right (±Y) edges of the outer surfaces of the front and rear (X direction) wall portions 11 of the fixed housing 1 protrude outward in the front and rear (X direction) as convex portions 111. A middle plate 112 extending upward and downward (in the Z direction) is provided between the left and right (Y direction) convex portions 111 on the outer surface of the wall portion 11. Then, a positioning boss 113 is provided near below (−Z) the middle plate 112 out of the lower surface of the wall portion 11. This positioning boss 113 is fitted into a positioning hole of an electronic board when fixing the receptacle unit 93 to the electronic board.

Holders 121 for mounting the anchor plates 4 are provided at end portions on the front side (+X) and rear side (−X) of the outer surface of the left and right (Y direction) wall portions 12 of the fixed housing 1.

Returning to the cross-sectional view of the entire connector in FIG. 2, as shown in FIG. 2, the inner surfaces of the left and right (Y direction) wall portions 22 of the floating housing 2 are stepped surfaces in which the lower surface protrudes toward the slot 20 side relative to the upper surface. The lower sides of the inner surfaces of the left and right (Y direction) wall portions 22 of the floating housing 2 are respectively provided with a row of K/2 slits 26-*j* arranged in the front and rear (X direction). On the upper sides of the outer surfaces of the left and right (Y direction) wall portions 22, there are curved portions 24 curved outward in a quarter arc-shape, and there are outer edge portions 25 parallel to the outer surfaces on the curved portions 24.

As shown in FIG. 2, a bottom portion 23 forming the bottom of the slot 20 is bridged between the lower end portions of the front and rear (X direction) wall portions 21 in the floating housing 2. The bottom portion 23 extends in a straight line in the front and rear (X direction). Through holes 220 are provided between the bottom portion 23 and the inner surfaces of the wall portions 22 on both left and right (Y direction) sides thereof. The through holes 220 penetrate through from the bottom surface toward the inside of the slot 20. The bottom surface of the floating housing 2 is provided with a conductive resin member 5. The bottom surface of the bottom portion 23 of the floating housing 2 is provided with a groove 230 for fixing the conductive resin member 5. The bottom surface of the conductive resin member 5 is further provided with a ground reinforcing metal fitting 280 (See bottom section of FIG. 18). The ground reinforcing metal fitting 280 includes a base portion 285 in a stripe-shape corresponding to the shape of the groove 230 and a plurality of hook portions 287. The hook portions 287 are provided on the longitudinal side surface of the base portion 285 at intervals matching the intervals of the pillar portions 59 in the X direction, and are vertically disposed toward the groove 230 side so as to draw a slightly inward arc at a tip slightly extended outward from the side surface of the base portion 285. The ground reinforcing metal fitting 280 supports the convex portion 53 of the conductive resin member 5 from the bottom surface side with the base portion 285, and the hook portions 287 fit into the intervals of the pillar portions 59 in the X direction, so that the conductive resin member 5 is held from the side surface sides, thereby increasing the stability and robustness of the receptacle unit 93.

Figure 19:
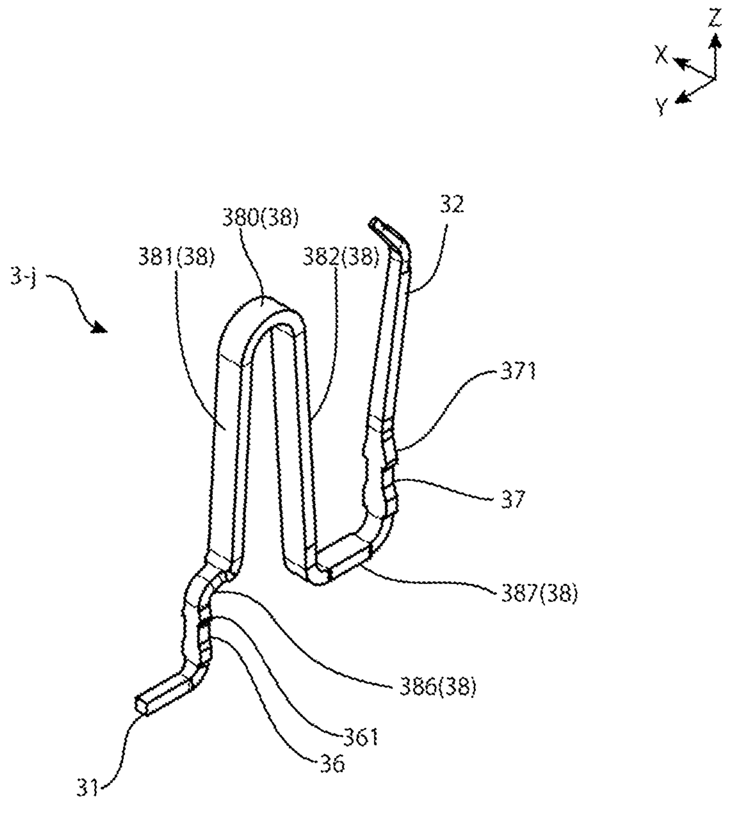
FIG. 19 is an example of a perspective view showing an individual detailed configuration of a contact 3-*j* (j=1 to K)

The overall schematic configuration of the contacts 3-*j* (j=1 to K) included in the receptacle unit 93 is shown in the middle lower section of FIG. 18, and an individual detailed configuration of a contact 3-*j* (j=1 to K) is shown in the perspective view of FIG. 19. As shown in FIG. 19, the contact 3-*j* has a terminal portion 31 extending in a left-right (Y direction) direction on one end side, a contact point portion 32 extending in an up-down direction on the other end side, a support piece portion 36 connected to the terminal portion 31, a support piece portion 37 connected to the contact point portion 32, and an elastic deformation portion 38 interposed between these two support piece portions 36 and 37. The tip end of the contact point portion 32 is bent into a doglegged shape.

The elastic deformation portion 38 has a flexible portion 380 rounded in an arch shape, two portions of linear portion 381 and linear portion 382 extending downward from both ends of the flexible portion 380, a connecting portion 386 bent toward the support piece portion 36 side at the lower end of the linear portion 381 and connected to the upper end of the support piece portion 36, and a connecting portion 387 bent toward the support piece portion 37 side at the lower end of the linear portion 382 and connected to the lower edge of the support piece portion 37. The elastic deformation portion 38 can be elastically deformed frontward, rearward, leftward, and rightward (in the X direction and Y direction).

As shown in FIG. 18, the anchor plate 4 has a main body portion 41, and a protruding portion 42 protruding downward from the lower edge of the main body portion 41. The protruding portion 42 is provided with a long hole 421.

Figure 20:
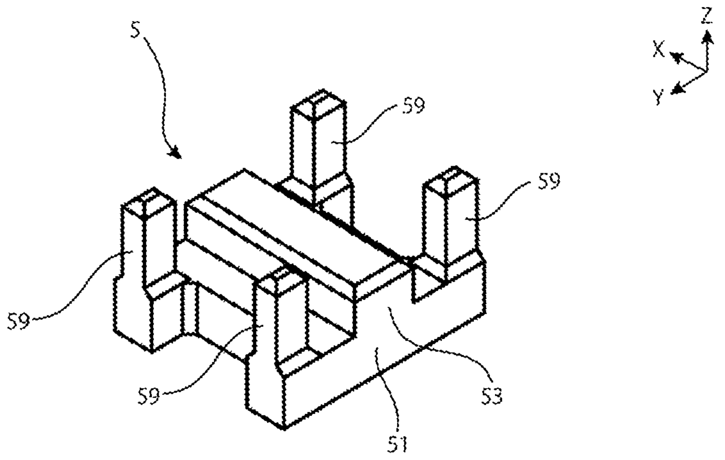
FIG. 20 is an example of a perspective view showing a conductive resin member 5.

As shown in FIG. 20, the conductive resin member 5 has a lower plate portion 51 in which four corners of a rectangular parallelepiped are protruded outward in the left and right (±Y) direction, a convex portion 53 protruding upward (in the +Z direction) from the center of the upper surface of the lower plate portion 51, and pillar portions 59 erecting upward (in the +Z direction) from tip ends of the lower plate portion 51 that are protruded outward in the left and right (±Y) direction. The width of the projection 53 in the left and right (±Y) direction is substantially the same as the width of the groove 230 of the bottom portion 23 of the floating housing 2 in the left and right (±Y) direction.

The fixed housing 1, the floating housing 2, the contacts 3-*j* (j=1 to K), the anchor plates 4, and the conductive resin member 5 are combined as follows, for example.

As shown in FIG. 13 and FIG. 16, the floating housing 2 is accommodated in the opening portion 10 of the fixed housing 1, two rows of contacts 3-*j* in the left and right (±Y) direction are bridged between the floating housing 2 and the fixed housing 1, the conductive resin member 5 is attached to the groove 230 (see FIG. 2) of the bottom portion 23 of the floating housing 2, the ground reinforcing metal fitting 280 is attached to the bottom surface of the conductive resin member 5, and the anchor plate 4 is attached to the holder 121 of the fixed housing 1.

Figure 14:
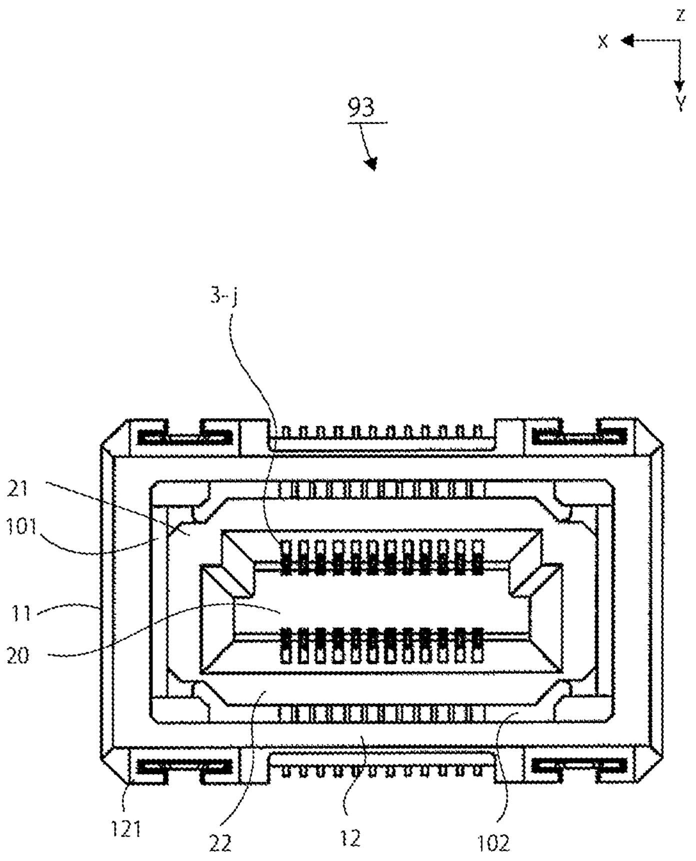
FIG. 14 is a plan view of the receptacle unit 93 shown in FIG. 13 as viewed from an upper (+Z) side.

As shown in FIG. 13 and FIG. 14, a movable space 101 for allowing the floating of the floating housing 2 in the front and rear (±X direction) is provided between the wall portion 11 of the fixed housing 1 and the wall portion 21 of the floating housing 2 in the opening portion 10, and a movable space 102 for allowing the floating of the floating housing 2 in the left and right (±Y direction) is provided between the wall portion 12 of the fixed housing 1 and the wall portion 22 of the floating housing 2. Similar to the contacts 7-*j* described above, the contacts 3-*j* (j=1 to K) are also arranged in such an arrangement order that two contacts 3-*j* (G) and two contact 3-*j*(S) are taken as one group, and two signal contacts are accommodated between the two ground contacts 2.

Referring again to FIG. 2, the contact 3-*j* is press-fitted into the fixed housing 1 and the floating housing 2 from the lower side such that the contact point portion 32 is protruded into the slot 20 via the through hole 220, and the elastic deformation portion 38 is accommodated in the movable space 102. The support piece portion 36 of the contact 3-*j* is accommodated and supported in the slit 17-*j*. The support piece portion 37 of the contact 3-*j* is accommodated and supported in the slit 26-*j*.

The connecting portion 387 of the contact 3-*j* is in contact with the lower surface of the floating housing 2. The terminal portion 31 of the contact 3-*j* is exposed to the lower side of the lower surface of the fixed housing 1. The terminal portion 31 of the contact 3-*j* is soldered and fixed to the pad of the electronic board. In the present embodiment, particularly, there is no partition for the particularly electric insulating member, and only an air layer exists between the adjacent contacts 3-*j*.

As shown in FIG. 2, a gap 120 is provided between the inner edge portion 15 of the fixed housing 1 and the outer edge portion 25 of the floating housing 2. On the lower side of the gap 120 in the movable space 102, the curved portion 14 of the wall portion 12 and the curved portion 24 of the wall portion 22 are curved along the shape of the flexible portion 380 of the elastic deformation portion 38.

Figure 15:
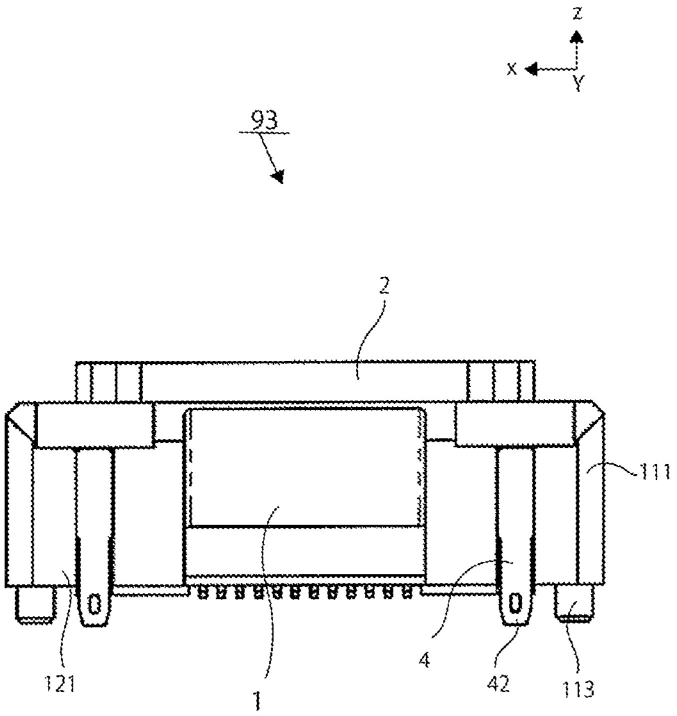
FIG. 15 is a front view of the receptacle unit 93 shown in FIG. 13 as viewed from a left (−Y) side.

The convex portion 53 of the conductive resin member 5 is fitted in the groove 230 of the bottom portion 23 of the floating housing 2. The two pillar portions 59 on the +Y side (left side of the paper surface of FIG. 20) of the conductive resin member 5 are in contact with the two contacts 3-*j* (G) on the +Y side (left side of the paper surface of FIG. 2). The two pillar portions 59 on the −Y side (right side of the paper surface of FIG. 20) of the conductive resin member 5 are in contact with the two contacts 3-*j* (G) on the −Y side (right side of the paper surface of FIG. 2). Thus, the four contacts 3-*j* (G) are electrically connected via the conductive resin member 5. The protruding portion 42 of the anchor plate 4 mounted on the holder 121 extends to the lower (−Z) side of the lower surface of the fixed housing 1 as shown in FIG. 15.

While the plug unit 97 is coupled to the expansion board, the plug unit 97 is turned upside down and roughly aligned with each other, as shown in FIG. 1 and FIG. 2, and then the header 62 of the plug unit 97 and the slot 20 of the receptacle unit 93 are fitted together by inserting the header 62 of the plug unit 97 into the slot 20 of the receptacle unit 93. Thereby, the open end (see FIG. 8) of the linear portion 72 of the contact 7-*j* of the plug unit 97 and the contact point portion 32 (see FIG. 20) of the contact 3-*j* of the receptacle unit 93 are electrically connected.

Figure 21A:
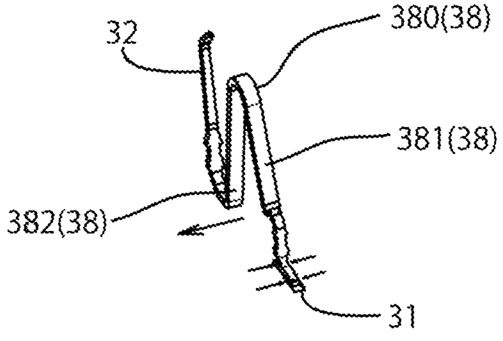
FIG. 21A is an example of a diagram showing how the receptacle unit 93 floats in a forward (+X) direction.
Figure 21B:
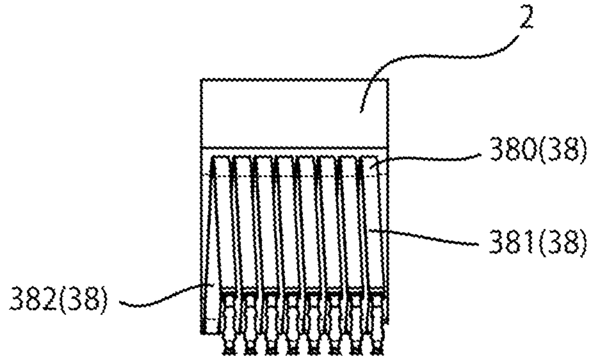
FIG. 21B is another example of a diagram showing how the receptacle unit 93 floats in the forward (+X) direction.

Here, even if the relative positions of the plug unit 97 and the receptacle unit 93 in the front and rear (±X) direction are misaligned due to, for example, insufficient accuracy during alignment, as shown in FIG. 21A and FIG. 21B, since the contact 3-*j* is twisted such that the linear portion 381 and the linear portion 382 are titled in opposite directions, the receptacle unit 93 moves in a direction to correct this misalignment on the front (+X) side and the rear (−X) side within the opening portion 10 of the fixed housing 1. Thereby, the positional misalignment in the front and rear (±X) direction is eliminated.

Figure 21C:
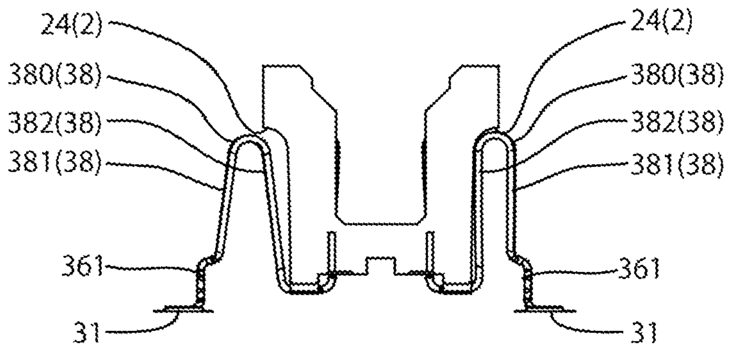
FIG. 21C is an example of a diagram showing how the receptacle unit 93 floats in a left and right (±Y) direction.

Further, as shown in FIG. 21C, when the relative positions of the plug unit 97 and the receptacle unit 93 in the left and right (±Y) direction are misaligned, the contacts 3-*j* in the left and right (±Y) direction are twisted such that the linear portion 381 and the linear portion 382 of one contact in the left and right (the +Y direction) expand, and the linear portion 381 and the linear portion 382 of the other contact in the left and right (±Y) direction are narrowed, so the receptacle unit 93 moves in a direction to correct the misalignment on the left side (+Y direction) or the right side (−Y direction) within the opening portion 10 of the fixed housing 1. Thereby, the positional misalignment in the left and right direction (±Y direction) is eliminated.

Thus, according to the connector of the present embodiment, the floating is allowed by absorbing the positional misalignment of the plug unit 97 and the receptacle unit 93 by the elastic deformation of the flexible portions of the contacts. Further, the housing of the receptacle unit 93 has an inner surface structure curved to correspond to the shape of the flexible portion 380 of the elastic deformation portion 38, thereby suppressing the impedance mismatch.

The detailed configuration of the present embodiment has been described above. According to the connector 100 of the present embodiment, it is possible to provide a connector for high-speed transmission that reduces crosstalk because: the connector includes a receptacle unit 93 mounted on an external electronic board, and a plug unit 97 mounted on an external expansion board, and electrically connects the first external board and the second external board by inserting, fitting and connecting the plug unit 97 into the receptacle unit 93 in the first direction, wherein the receptacle unit 93 and the plug unit 97 respectively include a plurality of first contacts 3-*j* and a plurality of second contacts 7-*j* arranged at predetermined intervals in the second direction orthogonal to the first direction, these first contacts 3-*j* and second contacts 7-*j* are respectively configured by arranging in the second direction a plurality sets of two ground contacts (G) set that sandwich a plurality of signal contacts(S) therebetween corresponding to each channel, and as for these first contacts 3-*j* and second contacts 7-*j*, respectively, in a plurality of rows of contacts provided in the third direction orthogonal to both the first direction and the second direction, at least either of the receptacle unit 93 and the plug unit 97 further includes shielding plates that are provided separated from each other in at least the second direction so as to correspond to each channel, and are electrically connected to the ground contacts (G) of the corresponding channels or to the ground of the electronic board or the expansion board, respectively, to at least block the noise between the adjacent channels in the left and right (±Y) direction, so that the inside of the connector is electrically divided for each channel, thereby absorbing the noise that may occur between the signal contacts(S) of the adjacent channels at least in the left and right (±Y) direction.

Further, in the connector 100 of the present embodiment, the receptacle unit 93 includes: a fixed housing 1 composed of a hollow frame body and fixed to an external electronic board; a floating housing 2 accommodated with a movable space 101 and a movable space 102 open in an opening portion 10 surrounded by the frame body of the fixed housing 1; and a plurality of contacts 3-*j* (j=1 to K) bridged between the fixed housing 1 and the floating housing 2, each having a supporting piece portion 36 supported by the fixed housing 1, a supporting piece portion 37 supported by the floating housing 2, and an elastically deformable elastic deformation portion 38 interposed between these two supporting piece portions 36 and 37. The elastic deformation portion 38 has: two linear portions 381 and 382 extending along the wall portion 12 and wall portion 22 facing the movable space 102 in the fixed housing 1 and the floating housing 2; and a flexible portion 380 between the upper ends of the two linear portions 381 and 382. Further, portions opposed to the flexible portion 380 in the wall portion 12 and the wall portion 22 are curved following the shape of the flexible portion 380. Thus, for example, as shown in FIG. 2, the wall portion 12 and the wall portion 22 come to confront the flexible portion 380 so as to cover the flexible portion 380, and variations in impedance between the flexible portion 380 and other portions of the contact 3-*j* are reduced. On the other hand, the movement of the floating housing 2 is not restricted by portions opposed to the flexible portion 380 in the wall portions 12 and 22. Therefore, a connector 100 capable of smoothly performing a floating function while suppressing the impedance mismatch of contacts 3-*j* is provided.

MODIFICATION EXAMPLE

Although the embodiment of the present invention has been described above, the following modifications may be added to this embodiment.

(1) In the above embodiment, a board-to-board connector including a receptacle unit with a floating structure has been taken up and described, but the present disclosure is not limited thereto, and can of course be applied to connectors without a floating structure as long as they are provided with shielding plates separated from each other in the front and rear (X direction).

In addition, in the above embodiment, the arrangement mode in which all of the shielding plates 80 are arranged for respective channels each composed of a ground contact 7-*j* (G), a signal contact 7-*j*(S), a signal contact 7-*j*(S) and a ground contact 7-*j* (G) has been taken up and described, but the arrangement mode of the shielding plates is not limited to this, and they may be arranged in any mode and shape as long as they are intended to shield inter-signal noise, such as in correspondence with each of the contacts 7-*j*, for example.

(2) In the above embodiment, the case where the receptacle unit 93 has two rows of contacts 3-*j* (j=1 to K) has been taken up, but it is not limited to this, and there may be one row or three or more rows of contacts 3-*j* (j=1 to K). Similarly, as for the plug unit 97, the case of having two rows of contacts 7-*j* (j=1 to K) has been taken up, but it is not limited to this, and there may be one row or three or more rows.

(3) In the above embodiment, the case where the shielding plates 80 are provided on the plug unit 97 sides has been taken up, but it is not limited to this, and the shielding plates 80 may be provided on the receptacle unit 93 side, or may be provided on both the plug unit 97 and the receptacle unit 93.

The shielding plate 80 may also be employed on the side having a floating structure or on the side not having such a structure. Further, when the shielding plates 80 are provided on one of the plug unit 97 and the receptacle unit 93, as in the above-described embodiment, it is preferable to provide a conductive resin member on the unit in which the shielding plates 80 are not provided. Thereby, crosstalk can be further reduced compared to the case where the shielding plates 80 are provided only on one side.

In the above embodiment, the mode in which the shielding plates 80 are provided so as to corresponding to all the channels on the plug unit 97 side has been taken up, but it is not limited to this, and both the shielding plate 80 and the conductive resin member 5 may be mixedly used. This point is the same when the shielding plates 80 are provided not only on the plug unit 97 side but also on the receptacle unit 93 side.

(4) The conductive resin members 5 are not limited to one row, but may be provided individually in, for example, the left row and right row of contacts 3-*j* (j=1 to K). In this case, one conductive resin member 5 is in contact with two contacts 3-*j* (G) sandwiching two contacts 3-*j*(S), and may electrically connect these two ground contacts 3-*j* (G).

(5) In the above embodiment, the mode in which guide grooves 89 corresponding to two shielding plates 80 are provided, and the two shielding plates 80 are stacked and press-fitted into the hole 87 has been taken up, but it is not limited to this, and if there is a margin in the design, two sets of guide grooves may be provided in the hole 87 so as to correspond to each shielding plate 80 individually, and the shielding plates may be press-fitted and arranged so as to be separated from each other not only in the front and rear (X direction) but also in the left and right (Y direction).

(6) In the above embodiment, the mode in which two shielding plates 80 are stacked and press-fitted into the guide grooves 89 to correspond one-to-one to both channels on the left side and the right side (±Y direction) has been taken up, but it is not limited to this, for example, a metal plate 81 may be formed with a thickness equivalent to the thickness of the two shielding plates 80 in the above described embodiment, and may be arranged so as to be integrated with the hook portions facing oppositely to each other on the left and right side (Y direction).

(7) In the embodiment described above, the number of the anchor plates 4 is not necessary to be four, and may be one to three, or may be five or more.

(8) In the embodiment described above, the number K of the contacts 3-*j* may be 145 or more, or may be 143 or less.

Although the embodiments of the present disclosure have been described with reference to the accompanying drawings, these are provided for easy understanding of the disclosure, and the claims of the present disclosure are not limited thereby.

A person skilled in the art can implement the present disclosure by various modifications without departing from the scope and spirit of the present disclosure, for example, by incorporating the features of one Example into another Example, yet another Example can be obtained. A person skilled in the art can make various modifications, equivalent substitutions, or improvements in accordance with the spirit of the present disclosure without departing from the scope of the claims.

EXPLANATION OF REFERENCE SYMBOLS

1 fixed housing
2 floating housing
3 contact (first contact)
4, 8 anchor plate
5 conductive resin member
6 housing
7 contact (second contact)
10 opening portion
11 wall portion
12 wall portion (first wall portion)
14, 24 curved portion
15 inner edge portion
17, 26, 66 slit
20 slot
21 wall portion
22 wall portion
23 bottom portion
25 outer edge portion
31 terminal portion
32 contact point portion
36, 37 supporting piece portion
38 elastic deformation portion
41 main body portion
42 protruding portion
51 lower plate portion

53 convex portion
59 pillar portion
62 header
63 base portion
67 through hole
72 linear portion
79 terminal portion
80 shielding plate
81 metal plate
83 hook portion
87 hole
89 guide groove
93 receptacle unit
97 plug unit
100 connector
101 movable space
102 movable space
111 convex portion
112 middle plate
113 boss
120 gap
121, 612 holder
181 rectangular piece portion
220 through hole
230 groove
280 ground reinforcing metal fitting
285 base portion
287 hook portion
380 flexible portion
381 linear portion
386 connecting portion
387 connecting portion
421 long hole
613 boss
631 outer edge portion
X second direction
Y third direction
Z first direction

What is claimed is:

1. A connector, comprising:

a receptacle unit mounted on a first external board; and a plug unit mounted on a second external board and connected to the receptacle unit, the connector electrically connecting the first external board and the second external board by inserting, fitting and connecting the plug unit into the receptacle unit in a first direction, wherein:

the receptacle unit comprises a plurality of first contacts arranged at predetermined intervals in a second direction orthogonal to the first direction and connected at one end to the first external board, the plug unit comprises a plurality of second contacts corresponding respectively to the first contacts and arranged in the second direction, each of the second contacts having one end connected to the other end of the first contact and the other end connected to the second external board, the first contacts and the second contacts are configured to form a plurality of channels when the plug is inserted into the receptacle, wherein each channel comprises two ground contacts and two signal contacts sandwiched between the two ground contacts, wherein the two ground contacts of each channel are independent of the ground contacts of the other channels, and at least either of the receptacle unit and the plug unit further comprises a plurality of shielding plates that are provided so as to be separated from each other in at least the second direction and each correspond to a different channel, and are respectively electrically connected to the ground contacts of the corresponding channels or to a ground of the first or the second external board, wherein the plurality of first contacts and the plurality of second contacts are provided in a plurality of rows in a third direction orthogonal to both the first direction and the second direction, and the shielding plates are provided between channels adjacent in the third direction, and in the third direction, at least two shielding plates of the plurality of shielding plates are provided in such a manner that each of the two shielding plates is in a one to one correlation with each channel.

2. The connector of claim 1, wherein, each shielding plate comprises a strip-shaped metal plate extending in the first direction, and the metal plates adjacent in the third direction are in contact with each other.

3. The connector of claim 1, wherein the shielding plate comprises a short strip-like metal plate and a hook portion extending from both ends of one end portion of the metal plate, bent into a hook shape toward the other end portion, and grounded.

4. The connector of claim 3, wherein at least either of the receptacle unit and the plug unit is bored with a hole that allows insertion of the shielding plate between channels adjacent in the third direction.

5. The connector of claim 4, wherein the shielding plates are arranged so as to be exposed from an outer surface of the connector through the hole.

6. The connector of claim 4, wherein the hole further comprises a guide groove which is a groove with a size corresponding to a width of the shielding plate, and is formed to extend outward in the second direction from inner wall surfaces facing in the second direction of the hole to guide the insertion of the shielding plate.

7. The connector of claim 6, wherein the shielding plates are arranged for respective channels adjacent in the third direction, the shielding plates are mounted to the receptacle unit or the plug unit by being respectively press-fitted into the guide grooves in a set of two so that the hook portions face in opposite directions to each other.

8. The connector of claim 1, wherein the receptacle unit comprises:

a fixed housing composed of a hollow frame body and fixed to the first board; and a floating housing accommodated with a movable space in an opening portion surrounded by the frame body of the fixed housing, the first contact comprises:

a first supporting piece portion bridged between the fixed housing and the floating housing and supported by the fixed housing;

a second supporting piece portion supported by the floating housing; and an elastically deformable elastic deformation portion interposed between these two supporting piece portions, the elastic deformation portion comprises:

two linear portions extending along wall portions facing the movable space in the fixed housing and the floating housing; and a flexible portion between upper ends of the two linear portions, portions opposed to the flexible portion in the wall portions are curved following a shape of the flexible portion.

9. The connector of claim 8, wherein the first contact comprises:

a terminal portion connected to the first support piece portion; and a contact point portion connected to the second support piece portion, the fixed housing further comprises:

first wall portions opposed to each other to surround the opening portion, the floating housing further comprises a slot into which the plug unit is inserted and a through hole penetrating from a bottom surface toward an inside of the slot, and the first contact press-fitted into the fixed housing and the floating housing such that the contact point portion protruded into the slot via the through hole and the elastic deformation portion is accommodated in the movable space.

10. The connector of claim 1, further comprising:

in the receptacle unit and the plug unit, a conductive resin member provided at an end portion on a side of the first or second external board to be connected, wherein the conductive resin member is provided corresponding to a channel other than the channels provided with the corresponding shielding plates among the channels, and is electrically connected to the ground contact of the corresponding channel.

11. The connector of claim 10, wherein the conductive resin member comprises: a lower plate portion; and a convex portion protruding from a center of the lower plate portion to a second side opposite to a first side that is a side of the first or the second external board, and the convex portion is fitted in a groove provided in a surface of the receptacle unit or the plug unit on a side of the external board.

12. The connector of claim 11, wherein the lower plate portion has a shape in which four corners of a rectangular parallelepiped are protruded outward in a third direction orthogonal to both the first direction and the second direction, a pillar portion erecting on the second side from the portion protruded outward is provided, and the pillar portion is in contact with a ground contact of a corresponding channel.

* * * * *